United States Patent [19]
Weise et al.

[11] Patent Number: 5,541,363
[45] Date of Patent: *Jul. 30, 1996

[54] WET-ENVIRONMENT ELECTRICAL JUNCTON BOX AND METHOD OF MAKING

[75] Inventors: Gary K. Weise, Irvine; Gary H. Kermoian, Corona; Richard J. Kesl, Yorba Linda, all of Calif.

[73] Assignee: Thermocraft Industries, Inc., Corona, Calif.

[ * ] Notice: The term of this patent shall not extend beyond the expiration date of Pat. No. 5,382,752.

[21] Appl. No.: 165,389

[22] Filed: Dec. 10, 1993

Related U.S. Application Data

[63] Continuation-in-part of Ser. No. 976,909, Nov. 16, 1992, Pat. No. 5,382,752.

[51] Int. Cl.$^6$ .................................................. H05K 5/00
[52] U.S. Cl. ................................ 174/50; 174/38; 174/51; 174/65 R
[58] Field of Search ............................... 174/50, 38, 51, 174/65 R, 67

[56] References Cited

U.S. PATENT DOCUMENTS

| | | | |
|---|---|---|---|
| 3,193,132 | 7/1965 | Gray | 174/50 X |
| 3,557,299 | 1/1971 | Dienes | 174/38 |
| 3,772,453 | 11/1973 | O'Brien | 174/65 SS |
| 4,266,266 | 5/1981 | Sanner | 174/38 X |
| 4,339,231 | 7/1982 | Conery et al. | 417/40 |
| 4,542,437 | 9/1985 | Ellis et al. | 174/38 X |
| 4,574,337 | 3/1986 | Poppenheimer | 362/267 |
| 4,654,470 | 3/1987 | Feldman et al. | 174/50 |
| 4,789,759 | 12/1988 | Jones | 174/65 |
| 4,835,667 | 5/1989 | Wolfe | 362/276 |
| 4,859,812 | 8/1989 | Klosin et al. | 174/135 |
| 4,959,506 | 9/1990 | Fetty et al. | 174/65 R |
| 5,142,102 | 8/1992 | Michie | 174/50 |
| 5,147,980 | 9/1992 | Ferguson, Jr. | 174/51 X |
| 5,382,752 | 1/1995 | Reyhan et al. | 174/50 |

Primary Examiner—Laura Thomas
Assistant Examiner—Paramita Ghosh
Attorney, Agent, or Firm—Poms, Smith, Lande & Rose

[57] ABSTRACT

An electrical junction box for swimming pool light fixtures includes a base plate and a cover member. The base plate includes plural lower conduit bosses and sockets in an array for sealingly receiving polymeric electrical conduits. The sockets are configured to singularly provide all necessary support to the junction box as installed. A grounding and bonding member is carried by the base plate within the junction box, and is configured in coordination with the array of conduit sockets to assist in organizing electrical wiring within the junction box. A strain relief structure is arranged adjacent to each conduit socket to centralize or group the wires brought into the junction box, while the grounding and bonding member (and an external bonding wire connection feature as well) provides unprecedented convenience of termination for the centralized or grouped wire connections. Also, the junction box is arranged in either a circular or elongate configuration with multiple planes of real or virtual symmetry in plan view allowing an omnipositional use of the junction box with respect to adjacent external structures. As a result, conduit risers at construction sites may be merely bunched at the location where the junction box is to be installed, and the junction box is slipped onto these conduits and is sealingly bonded thereto.

30 Claims, 7 Drawing Sheets

WET-ENVIRONMENT ELECTRICAL JUNCTON BOX AND METHOD OF MAKING

CROSS REFERENCE TO RELATED APPLICATION

This application is a continuation-in-part of U.S. application Ser. No. 07/976,909, filed 16 Nov. 1992, now issued on Jan. 17, 1995, as U.S. Pat. No. 5,382,752.

FIELD OF THE INVENTION

The present invention relates to protective electrical junction boxes within which electrical wiring connections are made. More particularly, the present invention relates to electrical junction boxes which are useable for wiring installations including, for example, outdoor, partially subterranean, partially underwater, or weather-exposed wiring runs, to which a variety of installation circumstances may apply, and to which stringent electrical code requirements may pertain in order to protect humans and animals which may come into the environment around the junction box.

Still more particularly, the present invention relates to an electrical junction box which by its embodied combination, arrangement and cooperation of features allows unprecedented utility for its use in electrical wiring to light fixture installations at swimming pools. More particularly, the present junction box allows installation on supporting conduits or mounting brackets without the need to relatively rotate the junction box into threaded engagement with electrical conduits, as is required for conventional junction boxes. Accordingly, the present junction box has an unprecedented installation ease compared to the conventional junction boxes.

BACKGROUND OF THE INVENTION

The electrical wiring art includes many varieties of junction boxes. These junction boxes range from the simple, rather small metal or plastic variety used with conventional Romex wire for protected inside residential wiring, to the large, complex, and specially sealed junction boxes used in wet, hazardous, or flammable industrial environments. Many such junction boxes for specialized installation circumstances also require specialized electrical cable constructions specific to the particular use. However, few uses of junction boxes for electrical wiring are more demanding than electrical installations around swimming pools.

With the proximity to water around a swimming pool, and the necessary, although limited, access by those not skilled as electricians (for example, access by a home owner or resident in order to change the light bulb in a submerged swimming pool light fixture), the electrical code requirements applying to such installations are very demanding. Particularly, the American National Standards Institute/Underwriters Laboratories, Inc., (ANSI/UL) standard for junction boxes for swimming pool light fixtures (Standard for Safety, UL 1241), includes detailed and stringent requirements relating to all of: materials of construction; environmental sealing; connections, grounding, bonding, and strain relief of wiring; voltage drop, volume, and heat dissipation; and installation integrity factors (strength of mechanical connection between conduits and the junction box, for example); all intended to insure the safety of electrical wiring to lighting fixtures at swimming pools with their environment of corrosive chlorinated water, possible impact from lawn and gardening equipment or from toys used in and around the pool, foliage, insects, vermin, pets, children, and line voltage electricity.

As an example of the construction resulting from these standards, it may be noted that the usual light fixture for a swimming pool includes a water-tight lamp fixture having a bulb socket, which is normally received into a nitch below water level in the pool, and which is connected by a length of flexible cable extending through a conduit to a junction box above water level. The junction box is usually located a short distance from the pool itself. Connecting to the lamp fixture through the flexible cable, and in addition to the "hot" wire which will be connected to the domestic power line when the light switch is on, may be a neutral wire, a ground wire, and a bonding conductor, all of which are connected to the grounding bus at the domestic line-voltage load center (breaker box) for the installation.

Thus, when a person (such as the home owner or resident) who may not be a skilled electrician, and who in fact may be somewhat careless around the pool while working to change the light bulb, removes the lamp fixture from the nitch and raises it above water level in order to change the light bulb, the bulb socket and fixture are effectively maintained at ground potential even if the switch for the light has been mistakenly left turned on. Even if one or two of the three ground-potential conductors at the bulb socket, including the ground conductor for the bulb socket, the neutral wire, or the bonding conductor, has become disconnected or broken, the home owner or resident is protected from electrical shock by the remaining one or more of these three conductors. Each of these conductors has sufficient current carrying capacity and a low enough voltage drop so that it is very unlikely that the person could be shocked or electrocuted while changing the light bulb. A current carrying path to ground of low voltage drop and high current capacity is ensured by one or more of the three grounded conductors so that the persons body is not subjected to line voltage even if the switch to the light has been left on during the bulb change. Further, additional national, regional, or municipal codes (National Electrical Code, NFPA 70, for example), may apply to a particular swimming pool light fixture installation. Thus, a multitude of differing combinations of code requirements may apply to swimming pool light fixture installations dependent on where they are located across the United States.

As a result, the electrical wiring industry has developed a very large number of standard junction boxes adapted to satisfy the generally applicable code requirements, to also satisfy the code requirements of certain locales, and to allow for a desired number of swimming pool light fixtures to be wired from the various designs of junction boxes. Some of these junction boxes are designed for use with metal conduit (brass or aluminum, for example), while others are designed for use with nonconductive polymeric conduit, such as that made from polyvinylchloride (PVC), for example, with the use of adapters or bonding bushings at the threaded conduit bosses of the junction box.

Some junction boxes for swimming pool light installations are designed to satisfy the local requirements as to conduit size, or materials and will not satisfy the requirements of other localities. Some junction boxes are even custom designed and manufactured as ordered to satisfy the combination of code requirements of particular locales and to allow the desired number of light fixtures to be wired from the junction box. That is, some locales require the use of plural junction boxes to wire a certain number of light fixtures, while another locale may allow a single standard or custom junction box to serve the same number of light fixtures. Alternatively, the expense and necessary waiting time of having a custom junction box designed and made may mitigate in favor of using plural commonly available junction boxes to satisfy the needs of a particular swimming pool light fixture installation, but at the expense of additional wiring and installation expense.

In view of the above, it is easy to understand why the wiring industry has developed plural swimming pool junction box designs, which are manufactured in plural sizes to meet varying installation needs. Of course, this variety in junction box designs and sizes means a great burden in junction box inventory for manufacturers and distributors, in installation logistics for swimming pool installation and service contractors in order to insure that the right junction box design and size is available and is used at a certain job, and for local building inspectors in the inspection of wiring installations because of the multitude of codes applicable to each particular installation, and the great variety of junction boxes which are available and which may or may not satisfy the mosaic of different code requirements for each installation.

It is easy to understand that there is a considerable challenge for the contractor and inspector in determining whether the junction boxes actually used out of the multitude of boxes available do, in fact, satisfy the many applicable code requirements at a job site. Of course, all of this leads to a resulting increase in the chances for error and disagreement between planners, installers, and inspectors, with resulting rework of wiring installations and loss of time and productivity.

In addition to the confusing variety of designs, sizes, and materials of swimming pool junction boxes, several available junction boxes have unfortunate features which make their use difficult in particular situations. For example, a particular box may limit installation flexibility because of its shape. That is, a rectangular junction box installed next to a wall may suggest that the length of the box be parallel to the wall. However, such installation requires that the electrical conduits to be connected to the box all be lined up parallel to the wall and spaced therefrom according to the positions of the conduit hubs or bosses of the junction box. On the other hand, the junction box by its design may require the installer or electrician to have access from the side of the box which is adjacent the wall.

That is, installation of the junction box, or connection of wiring therein, may necessitate horizontal access either manually or with tools into the junction box. Accordingly, while the home owner may prefer that the junction box be placed parallel to an adjacent house wall or fence, the electrician may require that the box be placed perpendicular to the wall or fence in order to complete the wiring installation. Thus, yet another limitation, that of access for wiring installation and service, is encountered with conventional junction boxes for swimming pool light fixtures when actual installation events and use environments are considered.

Additionally, conventional junction boxes when used with metallic conduit require that the box be threaded onto the threaded ends of the conduits, either directly or by the use of couplers. For a box with plural conduit bosses, only one of the conduits can be threadably connected directly with the junction box by relative rotation of the box at installation. Connection of all of the other conduits will require use of a coupler which is threaded into the threaded boss of the junction box. These couplers add complexity and expense to the installation of the junction box. Also, these couplers add additional leakage paths through which moisture may enter the junction box.

Similarly, when PVC conduit is used with conventional junction boxes, the junction box cannot be bonded directly to the plastic conduits. Accordingly, bonding adapters or bushings which thread into the threaded bosses of the junction box and include a captive PVC sleeve to which the plastic conduit can be bonded must be used. These bonding adapters simply slip onto the ends of the plastic conduit so that the requirement to rotate the junction box for threading engagement with a conduit is removed. Also, threading couplers, as are used with metallic conduit, are not required. However, the bonding adapters themselves add considerably to the expense and complexity of the installation. Also, these bonding adapters create additional leakage paths through which moisture may enter the junction box.

All of these limitations of conventional junction boxes for swimming pool light fixtures are known all too well to those working in the industry. However, prior to the present invention, no junction box gave significant relief to the plural deficiencies, and resulting long-felt need for improvements, as outlined above.

SUMMARY OF THE INVENTION

In view of the above, the present invention provides an electrical junction box including a generally planar polymeric base member which defines plural depending bosses, each defining both a generally cylindrical bore free of threads and forming a socket for bonding connection of a corresponding polymeric electrical conduit to the base member, and a through bore of selected size for passage of electrical wiring from the conduits into the junction box. Adjacent each of the inner openings of the bores, the base member includes a pair of upright spaced apart stanchions and an arcuate inclined upright wall portion extending between and connecting the stanchions. The connecting wall is textured to securely engage the jacket of an electrical cable, and a strain relief member is connected to the stanchions to force the cable into engagement with this textured surface.

On the upper surface of the base member, a plateau is formed upon which sets a metallic grounding and bonding member. The grounding and bonding member is provided with features which allow plural electrical conductors to be securely attached thereto in common electrical connection. More particularly, the grounding and bonding member includes plural transverse and upwardly open slots, which in particular embodiments of the invention, may be fanned, or may be arranged conveniently to extend along lines aligning generally with the locations of the conduit bosses on the base member. The bosses, bores, stanchions, connecting wall portions, and member for grounding and bonding are all arranged in a compact array.

Alternative embodiments of the invention may be round in plan view with plural planes of symmetry allowing ease of installation without requiring particular orientations of the junction box with respect to surrounding features, such as a house wall or fence. The base portion also externally carries a bonding connector which is electrically connected with the member for grounding and bonding. This connector may be used to attach an external bonding conductor to the junction box.

The stanchions define vertically extending holes which receive screws to secure the strain relief members. These members includes an inclined wall portion cooperable with the arcuate inclined wall portion of the base member to capture an electrical cable therebetween in strain-relieving relation. The base member and strain relief members define cooperating surface features which ensure transferral of strain relief and installation forces to the base member, and isolate the screw threads of the stanchions and screws from lateral strain relief forces.

The junction box also includes an environmental cover member sealingly cooperable with the base member to provide a weather-tight volume around the wiring connections therein. Reinforcing bosses are defined by the base member for receiving self-threading screws passing through aligned apertures of the cover member to secure the latter to the base member. The array of cover screws according to alternative embodiments of the invention is also symmetrical on the base member, and is coordinated with the array of bosses, wiring bores, and stanchions to define a gasket pathway on the base member. A groove on the cover member is congruent to the gasket pathway, and receives an o-ring type sealing member cooperable with the cover and base members.

Because of the arrangement of features outlined above, access only from above (without the necessity of horizontal access into the junction box) is sufficient to effect strain relief or ground wire connections to the base member during installation and service. The sizes, number of a particular size, and locations in the array of structural features on the base member, as well as the size and number of the conduit sockets on the base member, is very carefully selected to allow the inventive junction box, in view of its other features as well, to meet applicable code requirements, including national codes and the codes of many locales, to provide an improved flexibility and ease of installation, to reduce inventory requirements, and to increase the number of lighting fixtures which may be wired out of each junction box.

Also, because the inventive junction box allows bonding connection to the PVC electrical conduits (as opposed to threaded connection), there is no requirement that the junction box be rotational relative to any of the conduits at installation. Couplers or bonding adapters need not be used with the inventive junction box, and the additional leakage paths created by such couplers and adapters is eliminated.

In view of the above, it may be appreciated that the inventive junction box provides improved flexibility of installation because it does not require any particular arrangement of the box relative to a wall or other structure, and the conduits to be connected to the junction box may simply be bunched at the location where the box is to be installed. The junction box is simply bonded to the upper ends of the PVC conduits, and may be supported exclusively by these conduits. Ease of installation is improved because only vertically downward (or vertically upward in the case of the bonding wire connection) access from above (or below) the base member is necessary to make all wiring connections, strain relief attachments, as well as ground wire and bonding wire connections to the base member.

Additionally, the fanned alignment of the ground wire and bonding wire slots eases insertion of the respective wires into their appropriate locations. Only a slight rotation of the wrist and sliding of the wire end downwardly into a particular upwardly-open slot is required. Thereafter, the securing screw is threaded into the grounding and bonding member to capture the wire end therein. The ease and durability of strain relief installation is also improved because the strain relief members and base member cooperate to isolate lateral stresses from the securing screws. In other words the screws do not tend to bind in or strip out the threads of the stanchions. These and additional advantages of the present invention may be further appreciated from a reading of the appended detailed description of three alternative preferred embodiments of the invention, taken in conjunction with the attached drawing figures.

DETAILED DESCRIPTION OF A PREFERRED EMBODIMENT OF THE INVENTION

Figure 1:
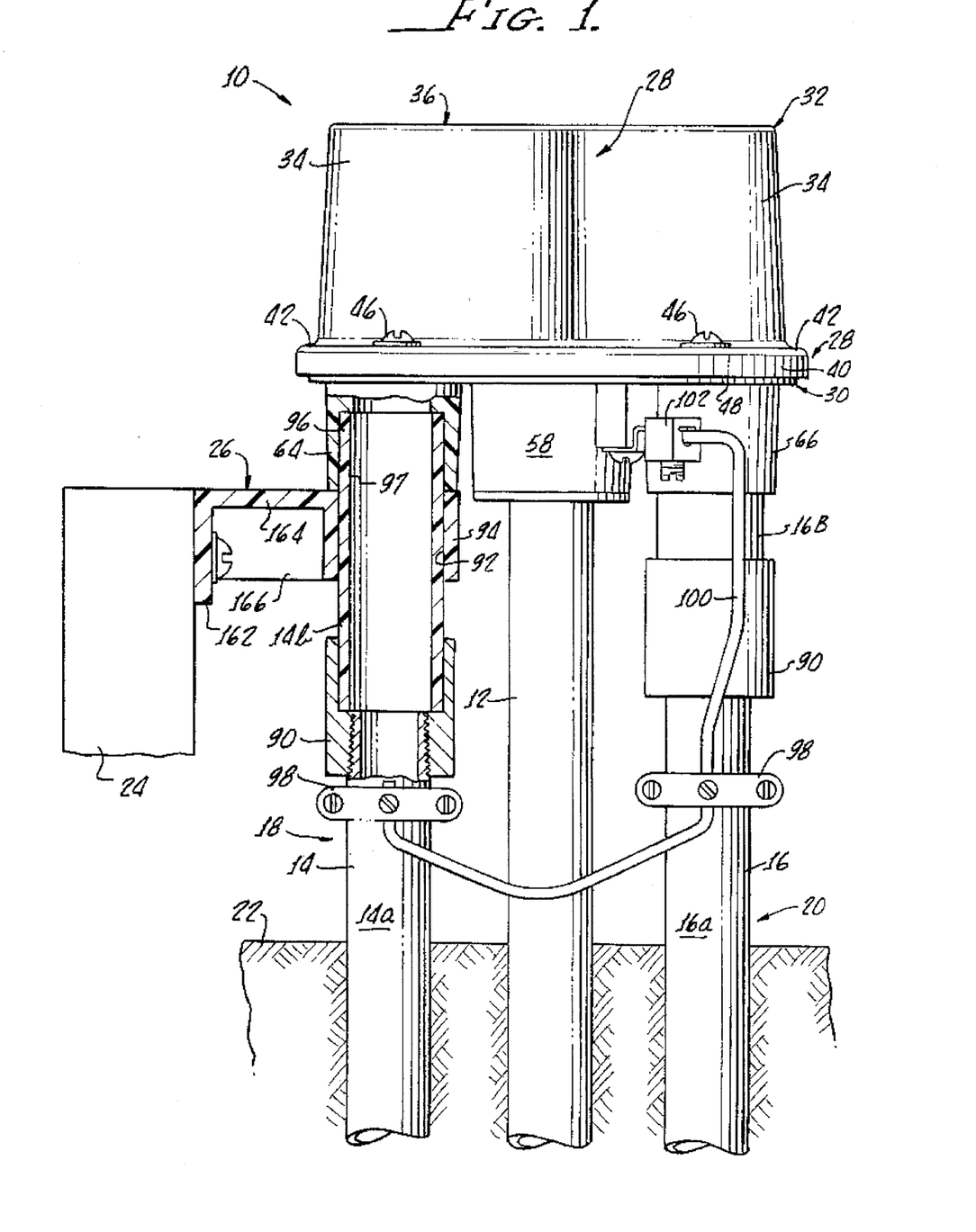
FIG. 1 provides a side elevation view, partially in cross section, of a junction box according to the present invention as it may appear in a typical installation.

FIG. 1 depicts a junction box 10 according to a preferred embodiment of the invention. The junction box 10 is disposed at the upper end of up to five electrical conduits, which are referenced with the numerals 12, 14, 16, 18, and 22, and only three of which are visible in FIG. 1. Although a lesser number of conduits may be connected to the junction box 10, the depiction of FIG. 1 shows five conduits. That is, as will be more easily understood after a complete reading of this description, two of the conduits (18 and 20) are hidden from view behind the conduits 14 and 16. The conduits 12–20 emerge upwardly in a group from the earth 22, and are connected sealingly to the junction box 10, as will be more fully described. Within each of the conduits extends respective electrical wiring (not seen in FIG. 1 for clarity of illustration).

For example, one of the conduits 12–20 will carry power-supply conductors forming part of a circuit extending from the line-voltage load center (circuit breakers) of the house or other facility, through a switch, and to the location where the junction box 10 is installed adjacent to a pool. The remaining conduits will carry conductors carrying the line voltage (when the switch is closed) to the pool lights or other outside lighting served by the junction box 10. These conductors will ordinarily be grouped into cables, which will include a power conductor, a neutral conductor, and a ground conductor. Additionally, a cable may include or be paralleled by a bonding conductor, as will be explained.

The junction box 10 may be supported exclusively by the conduits 12–20, or may be additionally supported, as depicted in FIG. 1, by an adjacent structure such as a wall or a post 24. A bracket member 26, which will be further described below, connects the junction box 10 supportingly to the post 24, and also provides for sealing connection of one of the conduits 12–20 (conduit 14) to the junction box 10.

Viewing FIGS. 1, 2, 3 and 3A in conjunction, it will be seen that the junction box 10 includes a hat-like environmental cover member 28 which sealingly cooperates with a generally planar and horizontal polymeric base member 30. Preferably, the base member 30 is molded of polyvinylchloride (PVC). More preferably, the base member 10 is molded of SP 71-07 PVC resin obtained from Georgia Gulf Plastics. The cover member 28 is preferably formed of molded polymer and is water proof and resistant to ultraviolet light. A material for the cover member 28 which has been proven to give good service is Lexan, from General Electric. Cover member 28 is circular in plan view, but includes an upright upper portion 32 which is generally square in plan view and rectangular in elevation. Upright upper portion 32 includes side walls 34 and a top or upper wall 36.

Within the cover member 28 is defined a downwardly opening cavity 38 (best seen viewing FIG. 2) which is also generally square in cross section. A brim or flange portion 40 cooperates with the remainder of the cover member to define a shelf 42 which outwardly of the side walls 34 is of circular segment shape. Thus, the shelf 42 includes four circular segment shaped portions 42a each one outward of a side wall 34. At the center of each portion 42a, the cover member 28 defines a through bore 44 through which may pass a self-tapping threaded fastener 46 for engagement with the base member 30.

At the outer periphery of brim 40, the cover member 28 includes a depending drip lip 48 overhanging base member 30, and ensuring that rain or pool water, for example, which falls on the cover 28 does not weep between the cover and base member 30. To further assure environmental protection for the interior cavity 38 of junction box 10, the cover member 28 defines a downwardly opening groove 50 which is generally square with rounded corners in plan view (still viewing FIG. 2). A resilient o-ring type seal member 52 is received into the groove 48 and is sealingly cooperable with the base member 30. It will be understood that cover member 28 cooperates with base member 30 to enclose a volume or chamber 54, viewing FIG. 3A.

Viewing now FIGS. 1–4 in conjunction, the base member 30 includes a generally planar plate portion 56 which is circular in plan view. This plate-like portion 56 defines four screw holes 44' aligning with the holes 44 of cover member 28, for threadably receiving the self-tapping screws 46. Depending from the plate portion 56, the base member 30 defines five bosses 58–66, four of which are arrayed circularly around the center one of the five. Each of the bosses 58–66 defines a respective vertically extending stepped through bore 68–76, a smaller-diameter portion of each of these bores opening upwardly on the plate portion 56 in a respective opening 78–86. A larger-diameter substantially cylindrical but slightly tapering lower portion of each bore 68–76 defines a conduit socket 88 of appropriate size (viewing FIGS. 3 and 3A). In contrast to conventional junction boxes for swimming pools and other such wet-environment wiring installations, the junction box 10 defines conduit sockets 88 which are free of screw threads, are defined by a polymeric (PVC) surface, and are intended for direct adhesive bonding sealingly to PVC electrical conduit.

Figure 3:
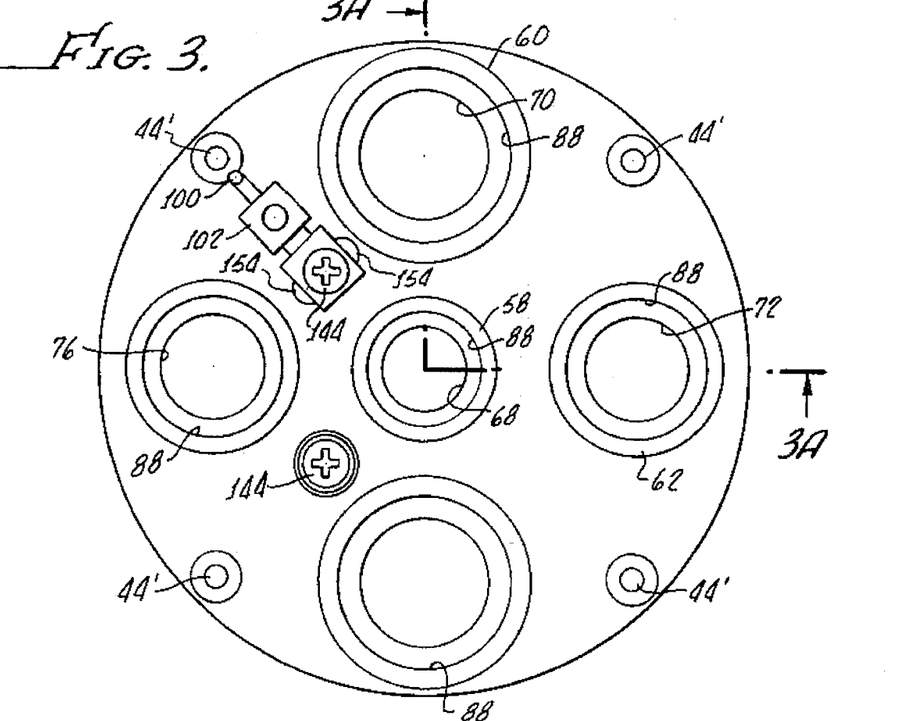
FIG. 3 provides an underside plan view of a base member portion of the junction box.
Figure 3A:
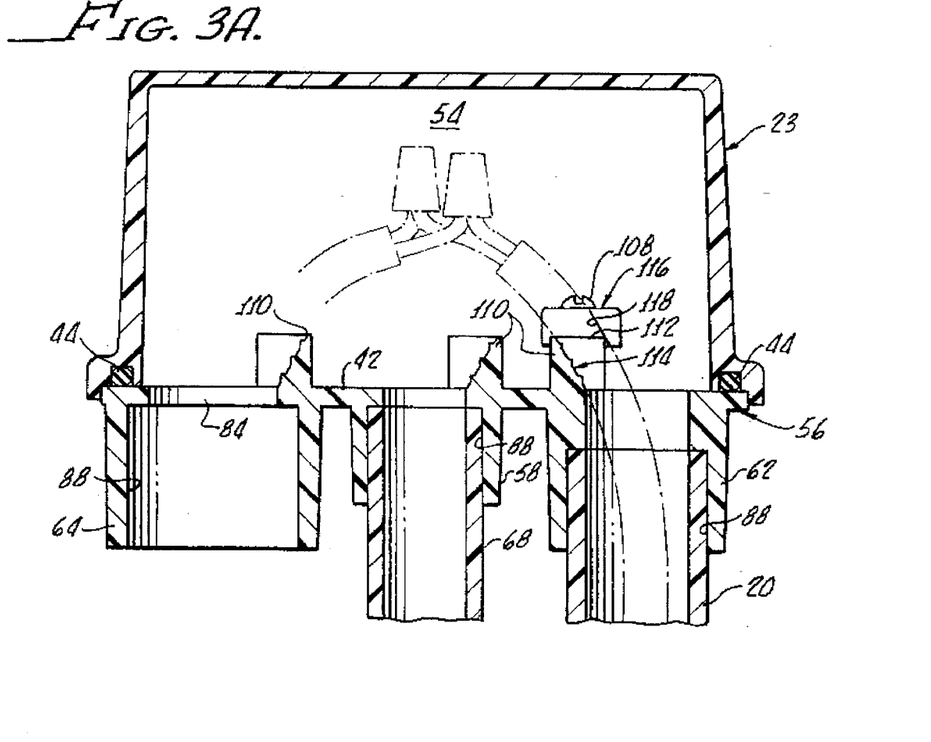
FIG. 3A is a fragmentary cross sectional view taken along line 3A—3A of FIG. 3, and looking in the direction of the arrows.

It will be noted that the bosses 58–66 and bores 68–76 are of differing sizes. That is the one boss 58 and bore 68 of smallest diameter are surrounded by four of larger diameter. The four larger diameter bosses and bores include two of intermediate size diametrically opposite one another, and two of largest size also diametrically opposite one another. Preferably the center bore 68 is sized to accept one-half inch PVC electrical conduit. The two intermediate size bores 72, and 76 are sized to connect with three-quarter inch PVC electrical conduit, and the remaining two bores 70, and 74 accept one-inch PVC electrical conduit. Also, preferably the cavity 38 has a volume of about 23 cubic inches. This combination of volume and other features will allow two pool lights to be wired out of the junction box 10.

Viewing FIG. 1, it is seen that for the particular installation depicted, the electrician has chosen to run a center PVC conduit 12 directly to the base portion 30 of junction box 10. This conduit 12 is inserted into and is adhesively bonded sealingly to the base member 30, by conventional solvent or adhesive bonding techniques. However, the electrician has chosen metallic conduit for most of the run of conduits 14 and 16. Consequently, the metallic lower portions 14a and 16a of these conduits is joined to respective PVC upper portions 14b and 16b, by the use of couplings 90. The upper PVC conduit portion 14a is bonded into a socket 92 formed in the lower portion 94 of the bracket 26. Alternatively, the bracket 26 may be provided with a threaded lower bore portion which will threadably engage onto the upper end of a metallic conduit and form a replacement for one of the couplings 90. In this way, a bracket member 26 can form both a supplemental support for the junction box 10, and also form an interface with a metallic conduit. This bracket 26 defines an upper nipple portion 96, which replicates the end of a PVC electrical conduit, and which is bonded sealingly into the socket 88 of boss 64. That is, the bracket 26 forms, in effect, an upper portion or extension of the associated electrical conduit. The socket portion 92 and the upper nipple portion 96 cooperate to define a through passage 97 passing the wires from conduit 14 into the cavity 38 of the junction box 10. The PVC conduit portion 16b is bonded directly into the socket 88 of boss 66.

Also seen in FIG. 1 is an implementation of one of the bonding options available with the present inventive junction box 10. In other words, the metallic conduits 14a and 16a themselves will provide electrical bonding continuity with the light fixtures served by these conduits. In order to electrically connect the metallic conduits to the junction box 10, a grounding clamp 98 is provided on each of the metallic conduit sections 14a and 16a. These grounding clamps 98 are connected by a bonding conductor 100 to a bonding lug 102, which depends from the underside of the base member 30. This bonding lug 102 is connected, for example, to the grounded neutral bar in the load center of the line-voltage load center, either by the neutral conductor of the power-supply cable within conduit 12, by a separate bonding conductor parallel with the power-supply cable within conduit 12, or both.

Those ordinarily skilled in the pertinent electrical arts will recognize that the conduit runs 14 and 16 could be formed entirely of PVC conduit. In such a case, the bonding conductor 100, or plural such bonding conductors, would extend from the bonding lug 102 alongside of the conduits 14 and 16, for example, to the light fixtures served by these conduits. The same example, and flexibility of installation, applies to the conduits 12, 18, and 20. That is, if an electrician chooses to do so for a particular installation, metallic electrical conduit may be used as described above with the junction box 10. However, in the interest of economy, ease and simplicity of installation, and elimination of the leakage paths which are created by couplings, such as couplings 90, the junction box 10 is preferably used with PVC electrical conduit.

Figure 2:
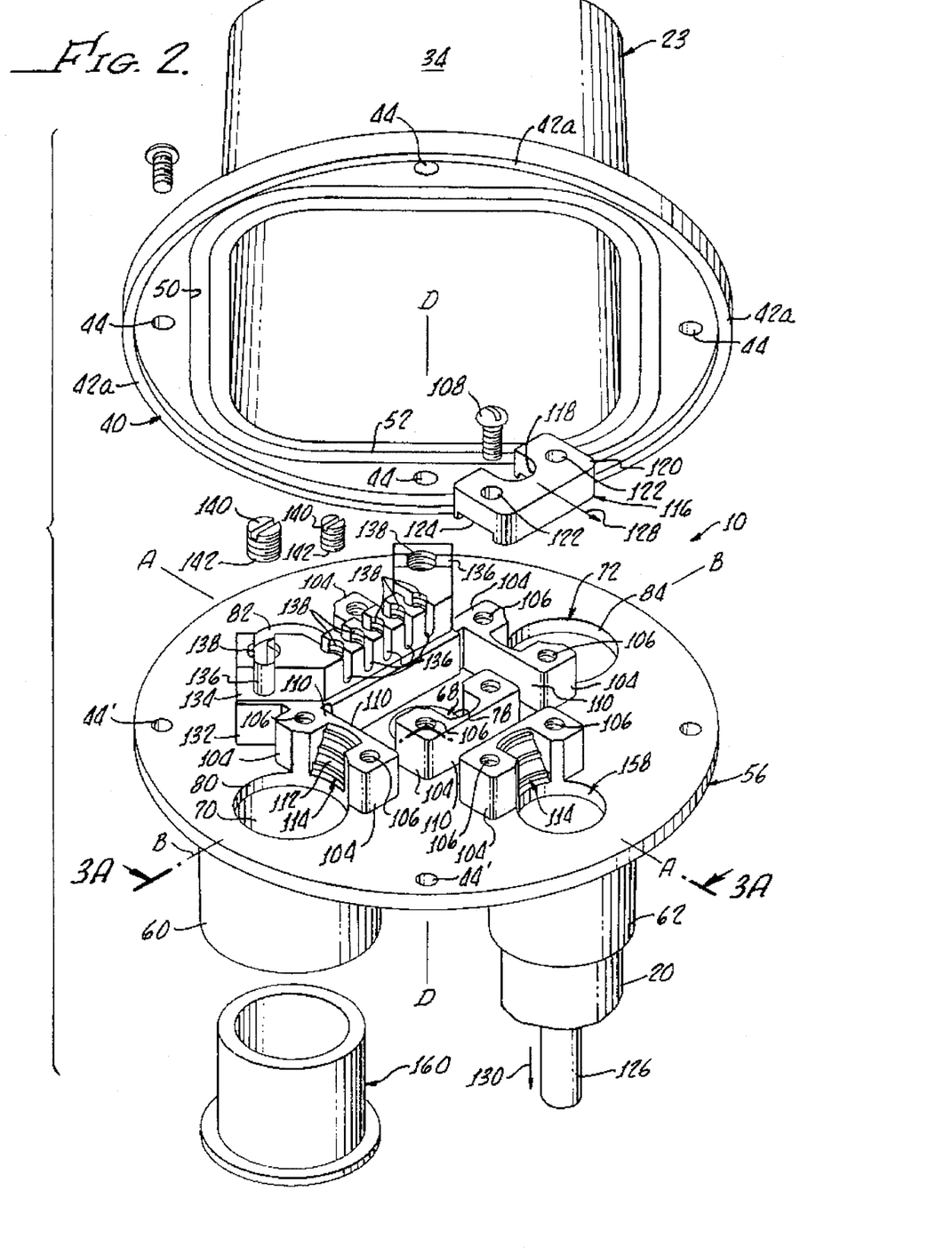
FIG. 2 provides a perspective exploded view of a junction box like that seen in FIG. 1, having wiring shown in phantom lines for clarity of illustration, and embodying the present invention.

Returning now to a consideration of FIG. 2, it is seen that the base member 30 also defines ten upright stanchions in spaced apart pairs adjacent to each of the openings 78–86, all but one of which is fully or partially visible in FIG. 2, and which are each referred to with the numeral 104. At the openings 80–86, the stanchions 104 are all disposed inwardly of the respective bore, as will be further explained below. Each stanchion 104 defines an individual vertically extending blind bore 106. Each bore 106 may receive a respective one of plural self-tapping screws 108. Extending upwardly from plate portion 46 between each pair of stanchions 104 is a respective inclined arcuate wall portion 110. The wall portions 110 at their lower extent are coincident with the openings 78–86 of bores 68–76 on the upper surface of plate portion 56. The wall portion 110 are inclined away from the axis of the respective bore, and define an arcuate, textured, strain-relief, cable-engaging surface 112. In order to provide a grip on an electrical cable, and in the form of texturing on the surfaces 112, each wall 110 also defines a pair of edged cable-engaging ridges or barbs 114.

Individually cooperable with the base member at any one or all of the five pairs of paired stanchions 104, the junction box 10 also includes a corresponding number of identical U-shaped strain relief members 116. Because the members 116 are identical, description of one will suffice to describe them all. These strain relief members 116 are U-shaped in transverse cross section to be received over the stanchions 104 and wall portions 110, as is best seen viewing FIG. 2. The strain relief members 116 are also U-shaped in plan view and define an inclined cable-engaging surface 118. At opposite end portions 120, the strain relief members 116 define respective spaced apart through bores 122 aligning with the bores 106 of the base portion 30 to receive screws 108. That is, the bores 106 of paired stanchions 104 are spaced apart by the same distance so that the strain relief members 116 may be received at any of the paired stanchions.

Importantly, the end portions 120 include a lip part 124 engaging the stanchions 104 opposite the strain relief surface 112. Viewing FIG. 2, it is seen that strain relief surface 112 is generally parallel with surface 118, and that both are inclined with respect to the vertical direction of stanchion 104 and screws 108. Thus, when the strain relief members 116 are moved downward on the stanchions 104, by tightening of the screws 108, a perpendicular distance between the surfaces 112 and 118 becomes smaller. Viewing FIG. 2 in detail, it is seen that the reaction force from strain relief member 116 forcefully engaging an electrical cable 126 is indicated by arrow 128. The lip 124 engages the stanchions 104 to react the force 128 so that this force does not result in a sideways force on the screws 108.

Also importantly, once the strain relief member 116 is firmly engaged into the jacket of cable 126, which jacket is generally a thermoplastic or thermoset polymer with yielding but shape-retaining properties, a pull force on the cable 126 (arrow 130) tends to engage the cable 126 even more firmly with the barbs or ridges 114. That is, the strain relief structure including stanchions 104, walls 110 with inclined surfaces 112 and edged ridges 114, cooperating with the strain relief members 116 having cooperating inclined surface 118, tends to have a self-wedging action so that the cable 122 cannot be inadvertently pulled from the strain relief.

Figure 4:
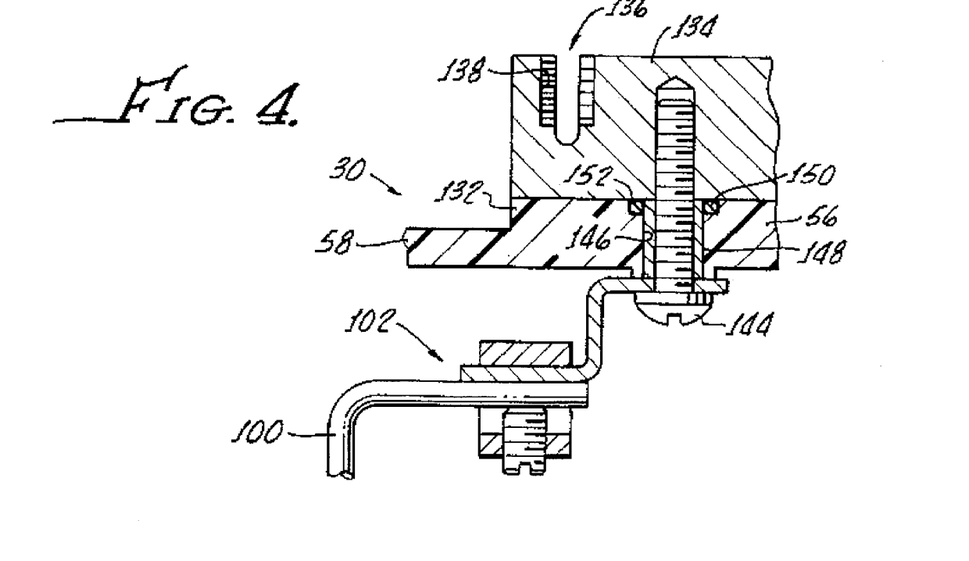
FIG. 4 is a partial cross sectional side elevation view of the base member of the junction box, again having wiring shown in phantom to better depict structure of the junction box without obstruction.

Viewing FIGS. 2–4, it is seen that the base member 30 includes a raised plateau portion 132 which is formed on and integral with the plate portion 56. This plateau portion 132 is somewhat U-shaped, somewhat V-shaped with a flattened bottom, or might be thought of as being of rocker-shape, and serves as a mounting feature for a similarly shaped congruent metallic grounding and bonding bar member 134. This grounding and bonding bar member 134 defines plural transverse slots 136 for receiving grounding or bonding conductors. Each slot 136 includes a vertically-extending threaded bore portion 138, which may receive a set screw 140 for securing the wires in the slots 136. Each set screw 140 includes a rounded lower end surface 142, which the Applicants have found to be by far the most preferable shape for securing wires in the slots 136, while also avoiding crushing or cutting of these wires.

FIGS. 3 and 4 show that the grounding and bonding member 134 is secured to the base member 30 upon plateau 132 with a pair of screws 144 which pass through respective bores 146 in the base member 30 (only one of the bores 146 being visible in FIG. 4), and which threadably engage with the member 134. Within each of the bores 146 is disposed a corresponding one of a pair of metallic sleeve members 148 (only one of which is visible in FIG. 4). These sleeve members 148 allow the screws 144 to be fully tightened without crushing the polymeric material of the plate portion of base member 30. The sleeves 148 also assist in securely fastening the grounding and bonding member 134 to the base member because they assist in preventing creep of the polymeric material of the base member and eventual loosening of the screws 146.

At the upper side of the plate portion 56, and immediately outwardly of the sleeves 148, the base member 30 defines an annular groove 150 around each of the screws 144. In these grooves 150 is received a respective o-ring member 152, which sealingly cooperate with the grounding and bonding member 134, so as to prevent environmental moisture from entering the interior cavity 38 of the junction box 10 through the bores 146. In view of the above, it is apparent that the junction box 10 is effectively closed against moisture, including rain and pool water, and against insects and vermin, so long as the cover 28 is in place on the base member 30. Also, the materials of construction of the present junction box effectively eliminate the corrosion problem which exists with conventional metallic junction boxes, especially in the environment of chlorinated water which exists around swimming pools. Accordingly, the wiring connections effected within the cavity 38 of the junction box 10 are effectively protected against environmental deterioration, and those around the junction box are protected from contact with line-voltage electrical currents. On the other hand, removal of the cover 28 allows full access to the wiring connections for service.

As FIGS. 3 and 4 also show, the base member 30 on the lower side of plate portion 56 and adjacent to one of the bores 146 (as is seen in FIG. 4), defines a spaced apart pair of arcuate projections or ears 154. Between these ears 154 and on the corresponding one of the screws 144, is carried the bonding lug 102. The ears 154 ensure that this bonding lug 102 has a preferred orientation, and does not interfere with the adjacent ones of the bosses 58–66.

Because the junction box 10 is intended to allow wiring of two light fixtures from the box, five grounding locations are available for ground wires in the five central slots 136. The two outer slots 136 are of a larger size, and are intended for use with bonding conductors, as is further explained below. The UL standard 1241 requires swimming pool light fixtures to have grounding terminations equal to the member of conduit openings. Because junction box 10 has five conduit openings, the five available ground wire slots meets this requirement.

Finally, viewing FIG. 2, it is also seen that the base member 30 includes an annular flat rim portion 156 upon which the cover member 28 sets. At 158, the rim portion 156 includes a seal member pathway where seal member 52 engages the base member 30. This seal member pathway 158 circumscribes the openings 78–86.

Viewing FIG. 2, and in view of the above, it is seen that base member 20 includes plural virtual planes of symmetry, and one true plane of symmetry. That is, the vertical plane "A" through the indicated bores 68–76, and openings 78–86, is a true plane of symmetry. The halves of base member 30 on opposite sides of this plane "A" are true mirror images of one another. However, base member 30 also defines three virtual planes of symmetry "B","C", and "D", which, but for small detail differences, would also be true planes of symmetry. This circular symmetry and centralized nature of the junction box 10 facilitates installation of the junction box adjacent structure without being constrained by orientation of the junction box 10. Also, only access from above vertically onto the base plate 30 and cover 28 is needed to complete wiring connections.

Having observed the structure of the junction box 10, attention may now be directed more particularly to its use. With respect to connection of the base member 30 to the conduits 12–20, each of these conduit connections is preferably effected by trimming the upper ends of the conduits to be substantially at the same height, and thereafter applying an adhesive or solvent to the outer surface of these conduits adjacent to these ends. The base member 30 is then simply slipped onto the conduit ends so that each conduit is received into a respective socket 88. When the adhesive cures, the base member 30 is permanently and sealingly connected on the conduits. The upper smaller diameter portions of the bores 68–76 prevent the conduits from slipping too far into the sockets 88, and from protruding on the upper side of the base member 30.

Importantly, the conduit connections with the base member 30 are effected without the need to rotate the base member relative to the conduits, as is the case with conventional junction boxes having threaded conduit bosses. In the event the electrician doing the initial installation of junction box 10 has chosen to use metallic conduit, as explained earlier, then the connections of couplings 90 to the metallic conduits, and the provision of the upper PVC conduit sections is made before the junction box 10 is connected to any of the conduits. In this case also, there is not a need for the junction box to be rotated relative to the conduits. This freedom from a requirement to rotate the junction box relative to the conduits, and the ability to simply slip the junction box onto the ends of the conduits, makes installation of the inventive junction box simpler, faster, and less expensive in terms of time required to complete an installation. FIG. 2 also shows a flanged plug member 160, which is available in various sizes to fit the sockets 88, and which may be similarly sealingly installed in any socket which is not to receive a conduit.

Figure 6A:
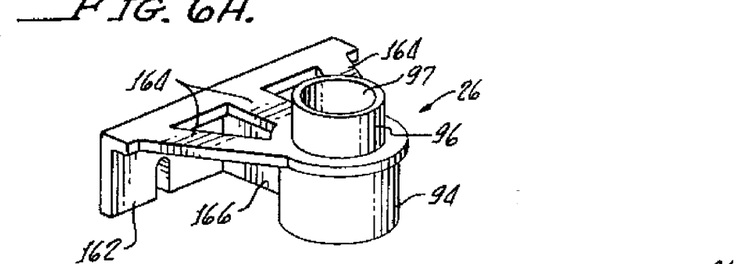
FIGS. 6A and 6B provide perspective views of a mounting bracket and conduit connector member, which is also seen in cross section in FIG. 1.
Figure 6B:
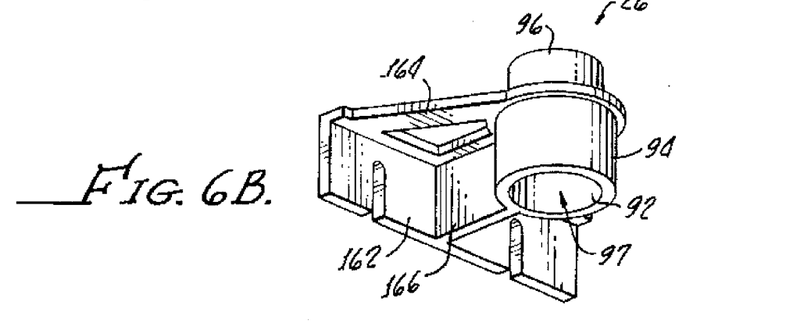

In the event that the electrician desires to provide additional support for the junction box, the bracket member 26 may be employed, as explained above. This bracket member provides a through passage 97 extending through the nipple portion 96 and lower portion 94 of this bracket member, the latter feature defining a socket 92 within which the corresponding conduit is sealingly bonded. FIGS. 6A and 6B show this bracket member in greater detail, and show that the bracket member 26 includes a plate-like mounting flange portion 162 by which the bracket member 26 may be secured to a wall or post, for example, by screws as seen in FIG. 1. From the flange portion 162 extends a windowed web portion 164, which is reinforced by a vertical gusset portion 166 joining with all of the flange portion, web portion, and lower portion 94. The web portion 164 circumscribes the juncture of the lower portion 94 and nipple portion 92 in order to form a stronger and more secure attachment for the junction box 10 with the supporting post 24. Importantly, it should be noted that even where the bracket member 26 is employed to additionally support the junction box 10, the associated conduit member still makes its full contribution to the support of the junction box 10 through the bracket member 26.

Figure 5:
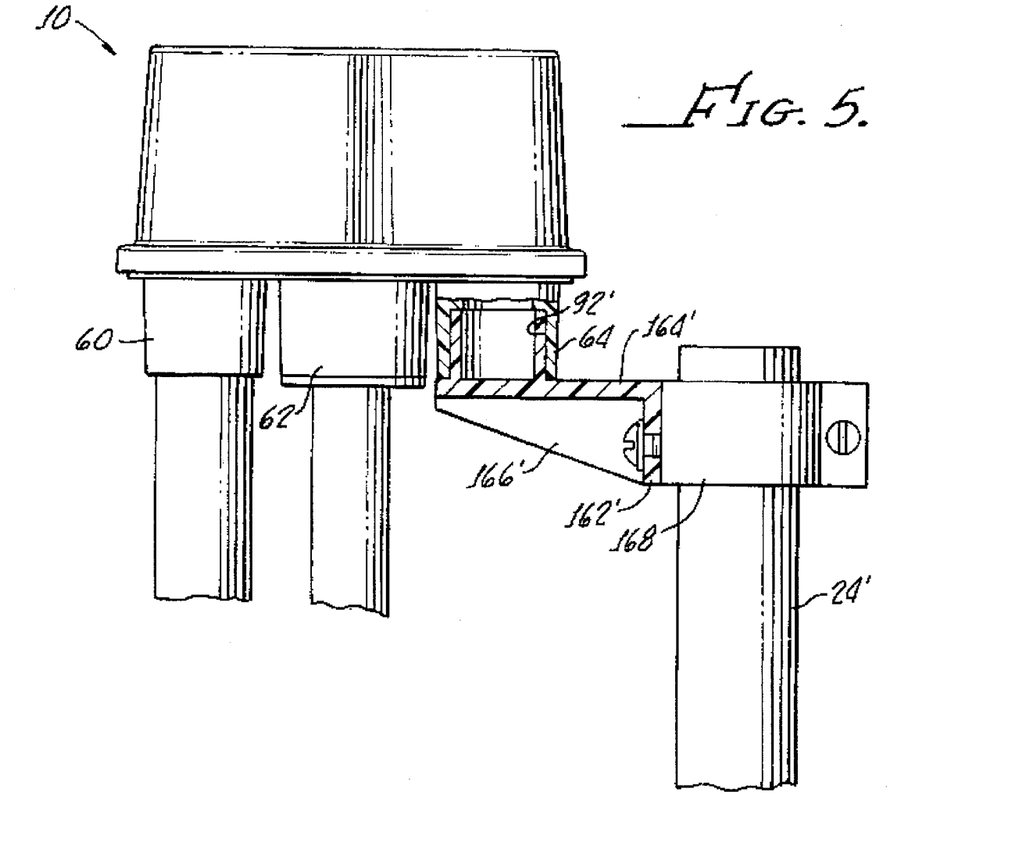
FIG. 5 presents a side elevation view of the junction box seen in FIGS. 1–4, and depicting an alternative installation detail of the junction box.
Figure 7A:
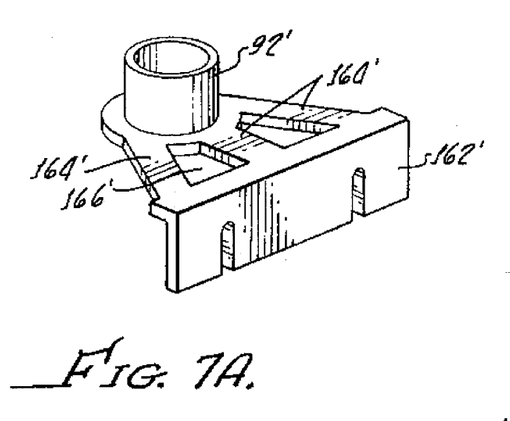
FIGS. 7A and 7B are perspective views of a mounting bracket member, which is also seen in cross section in FIG. 5.
Figure 7B:
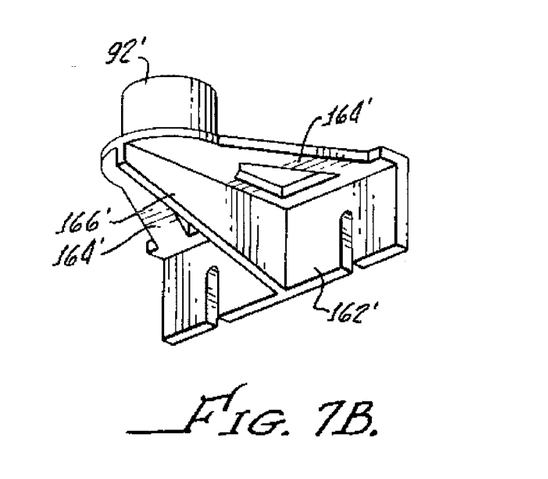

FIGS. 7A and 7B show an alternative design of bracket member 26', which is also shown in use to assist in supporting a junction box in FIG. 5. In order to obtain reference numerals for use in describing the bracket member 26' of FIGS. 7A and 7B, features which are the same or analogous in structure or function to those described above are referenced with the same numeral used above, and having a prime added thereto. As was pointed out above with respect to the use of the plug member 160, not all of the sockets 88 of a particular junction box are used for all installations. Accordingly, when such a situation arises, and there is a wish to additionally support the junction box 10, the electrician making the installation may select a support bracket 26' like that shown in FIGS. 7A and 7B to assist in supporting the junction box. As is shown in FIG. 5, the bracket member 26' is attached to a metallic post or pipe 24' by use of a conventional pipe hanger bracket 168.

Viewing the bracket member 26' of FIGS. 7A and 7B, it is seen to include a flange portion 162', web portion 164', and gusset portion 166'. The bracket member 26' also includes a nipple portion 96', having a passage 97' which is closed by the web portion 164'. In other words, this bracket member does not include a lower portion 94 or socket 92, and does not define a through passage for the passage of wires. The bracket portion 26' is equivalent in function to the plug member 160, and also can provide additional support to the junction box 10 by its connection with the post 24'.

It will be noted in view of the above, that all support to the present junction box is derived through the sockets 88. That is, if the junction box is supported exclusively by the electrical conduits, then all supporting forces in opposition to an impact with the junction box by a gardening tool, for example, is obtained from these electrical conduits. Along the same line, if one or more of the bracket members 26, or 26' is also employed to assist in supporting the junction box 10, then this additional support is provided to the base portion 30 via one or more of the sockets 88. These sockets 88 must accordingly provide not only a secure and sealed connection with the conduits or support brackets so that these are not dislodged or unsealed from the junction box, but also must have sufficient strength in connection with the plate portion 56 of the base member 30 so that the junction box 10 is not itself cracked or broken.

Understandably, these events could result in corrosive and conductive water being admitted to the electrical connections inside of the junction box 10, and perhaps could result in a person coming into contact with line-voltage current. However, the present inventive junction box is a compact and robust design having considerable strength, including strength at the sockets 88 sufficient to endure considerable abuse without breaking or allowing the conduits to be dislodged. The present inventive junction box has been determined to comply with the requirements of UL 514C with respect to these sockets and conduit connections.

Figure 8:
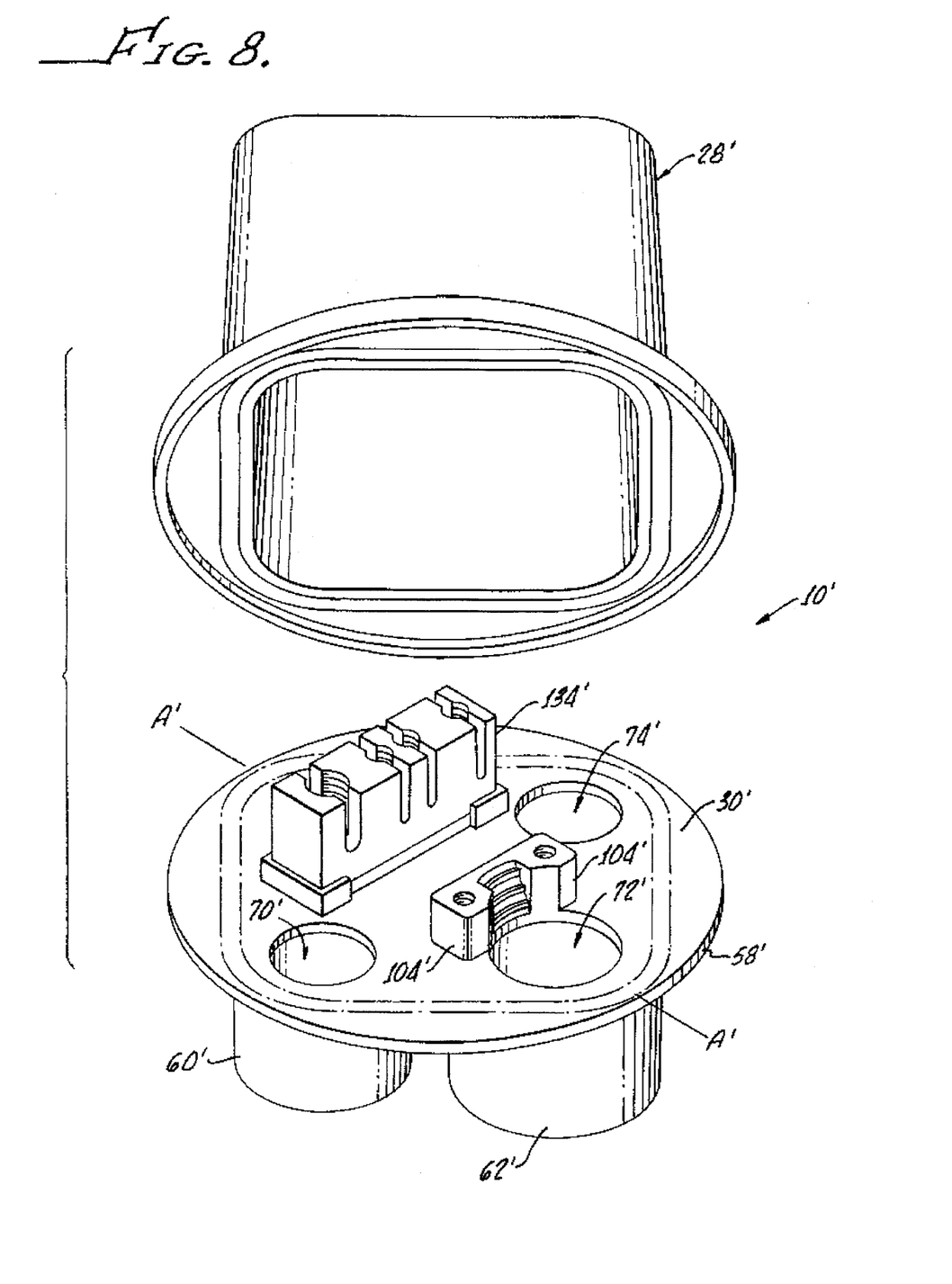
FIG. 8 provides an exploded perspective view, similar to FIG. 2, of an alternative embodiment of the present invention, which alternative embodiment is configured to accept a different number of conduit connections and to allow a different number of electrical connections therein, than the embodiment seen in FIGS. 1–7.
Figure 9:
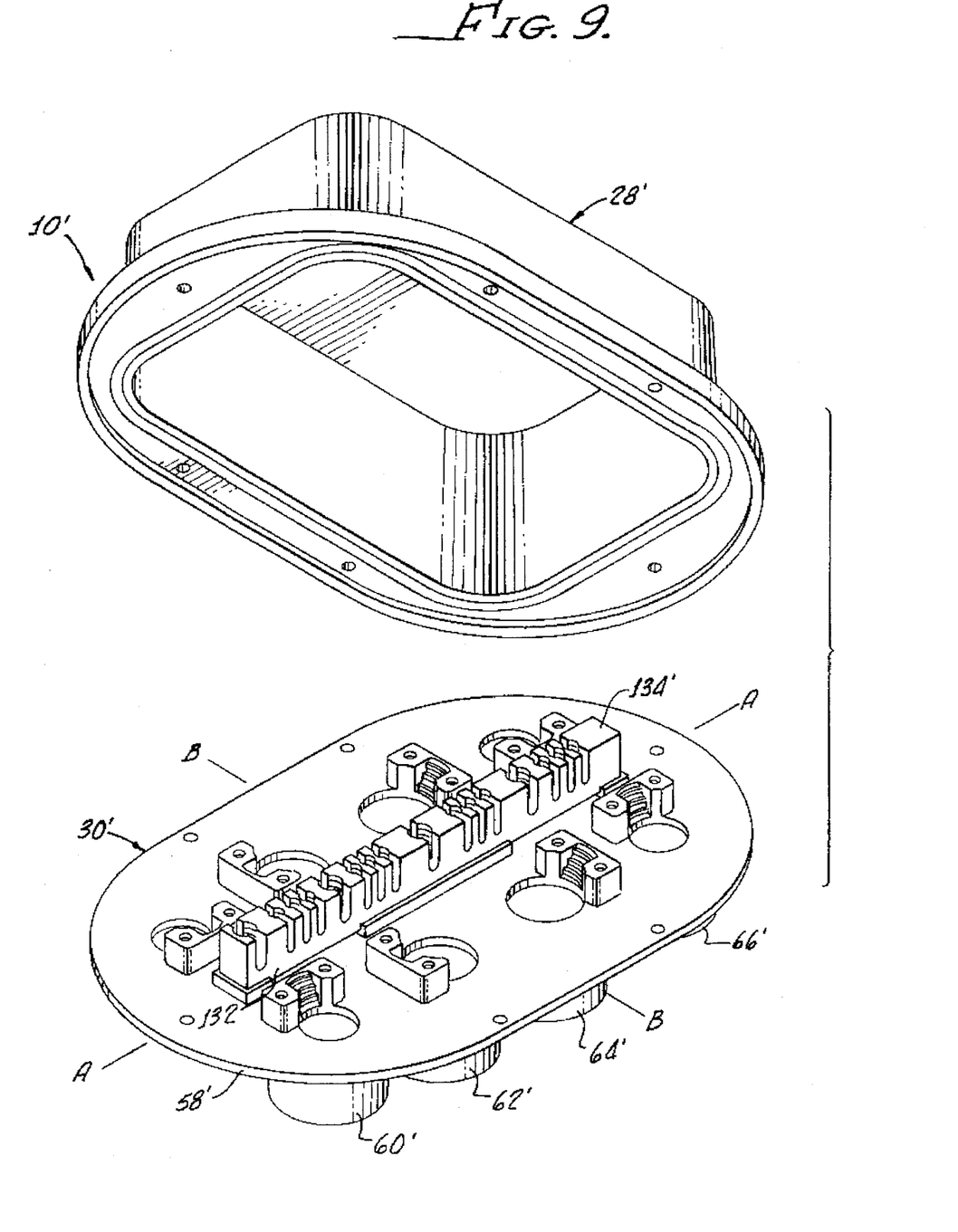
FIG. 9 is an exploded perspective view similar to FIGS. 2 and 8, and showing yet another alternative embodiment of the present invention.

Turning now to FIGS. 8 and 9, alternative embodiments of the present invention are depicted. In order to obtain reference numerals for use in describing the junction boxes of FIGS. 8 and 9, features which are the same or analogous in structure or function to those described above are referenced with the same numeral used above, and having a single or double prime added thereto. Viewing first FIG. 8, a junction box 10' is shown which is intended for wiring only a single swimming pool fixture. This junction box defines a cavity or chamber 38' of approximately 14 cubic inches volume. The conduit connections (sockets 88') of the junction box 10' of FIG. 8 are two of one-half inch size, and one of three-quarters inch size. This junction box also defines a plane of symmetry along the line A—A, which eases installation problems in the field with respect to surrounding structures and access for completion of electrical wiring. As with the first embodiment of the junction box described above, the strain relief features are arranged and angulated to centralize wiring in the junction box 10'. In other respects, as can be seen from the applied reference numerals, the junction box 10' of FIG. 8 is similar to the first embodiment described in detail above.

FIG. 9 shows an alternative embodiment of the present inventive junction box. The junction box 10" of FIG. 9 is generally linear and elongate rather than round in configuration and lay out. However, as can be seen from the commonality of referenced features on the embodiment of FIG. 9, all of the structural elements introduced above with respect to the embodiments of FIGS. 1–5 are also present in this junction box. Similarly to the embodiments introduced above, the junction box 10" of FIG. 9 defines a plane of symmetry at A—A, and at B—B. The ease of installation provided by the round embodiments of the present junction box are, thus, also substantially preserved by the elongate junction box 10".

The stain relief features of junction box 10" are arranged to incline the secured electrical wires along lines which are perpendicular or parallel to the length dimension (line A—A) of the junction box 10". Viewing the arrangement of these strain relief features as seen in FIG. 9, it will appear that the secured wires will be grouped into two groups at opposite ends of the junction box. This arrangement is particularly convenient because with four pool lights wired out of the junction box 10", two or more separately switched "hot" wires will probably be fed into the junction box, each to control one, two, or three of the four pool lights. Accordingly, the installing electrician will be working with groups of interconnected wires. On the other hand, the arrangement of the strain relief features in the junction box 10" does not prevent the box from being used to wire all four of the controlled lights from one switched "hot wire".

This junction box has sockets of one inch and three-quarter inch sizes. Four sockets of the one-inch size are centrally located, and the four sockets of three-quarter inch size are located, respectively, two at each opposite end of the junction box. This arrangement of the sockets further improves the installation variety and ease of installation and wiring installation for the junction box 10". This junction box, as depicted, has a volume of about 60 cubic inches. However, UL standards would allow this box to be reduced in size and volume to about 42 cubic inches, while still allowing the wiring of four swimming pool light fixtures from this box.

In view of the above, it is apparent that the present inventive junction box provides a heretofore unavailable combination of installation, wiring, service, safety, and secure supporting features. In each case of installation of the present junction box, the supporting forces are provided to the junction box itself through the sockets 88, which also serve to sealingly receive the ends of electrical conduits feeding wiring into and out of the junction box. Because the junction box is fabricated almost entirely (excepting the grounding and bonding bar and various fasteners and set screws) from polymeric material, there is no corrosion problem with this junction box, in contrast to metallic junction boxes.

While the present invention has been depicted, described, and is defined by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

We claim:

1. An electrical junction box comprising:

a polymeric generally plate-like base member integrally defining plural depending bosses each including a socket for adhesively and sealingly receiving a polymeric electrical conduit member, and plural respective through holes each communicating with one of said sockets and each defining an opening on an upper surface of said base member for upward passage of electrical wires into said junction box;

cover means defining a downwardly open cavity and sealingly cooperating upon said base member to define a volume within which said electrical wires may be interconnected;

said sockets having sufficient strength of integral connection with the remainder of said base member to effectively provide all support to said junction box.

2. The junction box of claim 1 wherein said sockets are free of screw threads.

3. The junction box of claim 1 wherein each of: said bosses with said through holes, a respective strain relief means arranged adjacent each through hole, and means for securing said cover member to said base member are all arranged to provide said junction box with plural real or virtual planes of symmetry in plan view, whereby said junction box provides rotational symmetry of installation in plan view and allows virtual omnipositional use of said junction box with respect to adjacent structures external to said junction box.

4. The junction box of claim 1 further including:

strain relief means cooperable with said base member adjacent a through hole thereof to clamp an electrical wire thereto in strain relieving relation.

5. The junction box of claim 4 wherein said strain relief means of said base member further includes:

a pair of upright spaced apart stanchion portions adjacent a through hole thereof, and an inclined arcuate wall portion extending between said stanchions, said strain relief means further including a strain relief member which in cross section is of inverted U-shape, said strain relief member being receivable over said stanchions and wall portion at said U-shape to oppose an arcuate inclined surface portion of said strain relief member with said arcuate wall portion.

6. The junction box of claim 4 wherein said strain relief means includes an inclined strain relief surface adjacent each through hole, said base member and cover means being sustantially round in plan view, and each strain relief surface being inclined upwardly and inwardly along a radial line of said junction box with respect to said base member to centralize wiring in said junction box.

7. The junction box of claim 6 wherein and said plural bosses and through holes are arranged in a generally circular array.

8. The junction box of claim 7 wherein said circular array of bosses and through holes includes one central boss and through bore with respective strain relief surface being inclined radially outwardly, and a circular array of bosses and through holes around said central one with respective strain relief surfaces inclined toward the center of said base member.

9. The junction box of claim 4 wherein said strain relief means includes an inclined strain relief surface adjacent each through hole, said base member and cover means being elongate in plan view to define a length dimension for said junction box and direction perpendicular to said length dimension, and each strain relief surface being inclined upwardly and inwardly along a line parallel with one of said length dimension of said junction box and said direction perpendicular to said length dimension of said junction box with respect to said base member to centralize wiring in said junction box.

10. The junction box of claim 9 wherein said bosses and through holes being arranged in two parallel rows on said base member and said respective strain relief surfaces being inclined upwardly and along a line parallel with or perpendicular to the length dimension of said base member.

11. The junction box of claim 10 wherein said strain relief surfaces are arranged to group electrical wires at opposite ends of said base member.

12. The junction box of claim 1 further including a metallic bar-like grounding and bonding member carried upon said base member, said grounding and bonding member having means for electrical connection of electrical conductors thereto.

13. The junction box of claim 12 wherein said base member is generally circular in plan view, includes three bosses and through holes in a triangular array, and said grounding and bonding member is generally straight to set upon said base member along a side of said triangular array.

14. The junction box of claim 12 wherein said base member is generally elongate with said bosses and through holes arranged in two rows side-by-side in a linear array along a length dimension of said junction box, and said grounding and bonding member is generally straight to set upon said base member between said two rows of bosses and through holes.

15. The junction box of claim 12 wherein said base member defines at least a pair of spaced apart bores under said grounding and bonding member, at least a pair of shape-retaining sleeve members respectively received one into each one of said spaced apart bores, and at least a pair of fasteners passing through said sleeve members and securing said grounding and bonding member to said base member.

16. An electrical junction box comprising: a polymeric generally plate-like base member intergrally defining plural depending bosses each including a socket for adhesively and sealingly receiving a polymeric electrical conduit member, and plural respective through holes each communicating with one of said sockets and each defining an opening on a upper surface of said base member for upward passage of electrical wires into said junction box;

cover means defining a downwardly open cavity and sealingly cooperating upon said base member to define a volume within which said electrical wires may be interconnected;

said sockets having sufficient strength of integral connection with the remainder of said base member to effectively provide all support to said junction box;

further including a metallic bar-like grounding and bonding member carried upon said base member, said grounding and bonding member having means for electrical connection of electrical conductors thereto;

wherein said base member is generally circular in plan view, and said grounding and bonding member is generally of rocker-shape to nest among said through bores.

17. An electrical junction box comprising:

a polymeric generally plate-like base member integrally defining plural depending bosses each including a socket for adhesively and sealingly receiving a polymeric electrical conduit member, and plural respective through holes each communicating with one of said sockets and each defining an opening on an upper surface of said base member for upward passage of electrical wires into said junction box;

cover means defining a downwardly open cavity and sealingly cooperating upon said base member to define a volume within which said electrical wires may be interconnected;

said sockets having sufficient strength of integral connection with the remainder of said base member to effectively provide all support to said junction box;

further including a metallic bar-like grounding and bonding member carried upon said base member, said grounding and bonding member having means for electrical connection of electrical conductors thereto;

wherein said base member defines at least a pair of spaced apart bores under said grounding and bonding member, at least a pair of shape-retaining sleeve members respectively received one into each one of said spaced apart bores, and at least a pair of fasteners passing through said sleeve members and securing said grounding and bonding member to said base member;

further including said base member defining a respective upwardly opening groove around each of said at least a pair of bores, and a respective o-ring seal member received into each of said grooves to sealingly inhibit passage of moisture along the respective bore into said junction box.

18. An electrical junction box comprising:

a polymeric generally plate-like base member integrally defining plural depending bosses each including a socket for adhesively and sealingly receiving a polymeric electrical conduit member, and plural respective through holes each communicating with one of said sockets and each defining an opening on an upper surface of said base member for upward passage of electrical wires into said junction box;

cover means defining a downwardly open cavity and sealingly cooperating upon said base member to define a volume within which said electrical wires may be interconnected;

said sockets having sufficient strength of integral connection with the remainder of said base member to effectively provide all support to said junction box;

further including a metallic bar-like grounding and bonding member carried upon said base member, said grounding and bonding member having means for electrical connection of electrical conductors thereto;

wherein said base member defines at least a pair of spaced apart bores under said grounding and bonding member, at least a pair of shape-retaining sleeve members respectively received one into each one of said spaced apart bores, and at least a pair of fasteners passing through said sleeve members and securing said grounding and bonding member to said base member;

further including a bonding connector carried on at least one of said at least a pair of screws and electrically connecting to said grounding and bonding member.

19. A wet-environmental electrical junction box comprising:

a polymeric, non-corroding and electrically non-conductive base member having a horizontal plate-like portion, said base member integrally defining an array of plural bosses depending from said plate-like portion, and each boss defining a respective stepped through bore including a smaller diameter bore portion defining a respective one of plural openings upwardly on said plate-like portion and downwardly providing a generally cylindrical bore portion which is free of screw threads and which defines a respective conduit socket for said base member into which a respective polymeric electrical conduit may be adhesively bonded sealingly too said base member;

said base member on an upper side thereof further including a plurality of upright stanchion portions in respective like spaced-apart pairs bracketing said plural openings of said through bores, each of said stanchion portions defining a vertical bore, and a respective arcuate inclined strain-relief wall spanning between said paired stanchions;

at least one strain relief member including a pair of end portions each defining one of a pair of vertical through bores matching said vertical bores of said paired stanchions, and an inclined strain-relief surface generally parallel and confronting said strain relief wall;

cover means defining a downwardly open cavity and sealingly cooperating upon said base member to define a volume within which electrical wires may be interconnected;

and said bosses having sufficient strength of integral attachment with said plate-like portion and the remainder of said base portion to provide all support for said junction box.

20. The junction box of claim 19 wherein said base member is generally circular in plan view and includes a circular array of bosses each with a respective through bore, and said arcuate strain relief walls at said circular array of through bores are inclined toward the center of said circular base member, thereby to centralize electrical wires relative thereto.

21. The junction box of claim 19 wherein said base member is elongate and includes two rows of bosses with respective through bores opening upwardly on said base member, said arcuate strain relief walls being inclined parallel with or perpendicularly to a length dimension of said junction box to group electrical wires therein.

22. The junction box of claim 19 further including an annular plateau including a seal member pathway, and said cover means including a hat-like cover member cooperable with said base member to enclose said volume, said cover member defining a groove congruent with said seal member pathway, and a resilient seal member received in said cover member groove for sealing cooperation with said base member at said plateau.

23. The junction box of claim 19 wherein said strain relief member includes a dependent lip engaging said paired stanchion members for transferring lateral strain-relief forces thereto.

24. The junction box of claim 19 wherein said hat-like cover member includes a downwardly opening polygonal cavity.

25. A method of providing environmentally protected electrical wiring connection to a swimming pool light fixture, said method comprising the steps of:

forming a polymeric non-corrosive and electrically non-conductive plate-like base member with a plurality of depending bosses, each boss having a respective through bore opening upwardly on the base member and downwardly defining a respective cylindrical socket for adhesively and sealingly receiving an electrical conduit;

sealingly bonding said junction box at the upper end of at least two electrical conduits each having at least an upper portion thereof formed of a bondable polymeric material which is received into a respective one of said sockets;

leading plural electrical wires from said conduits into said junction box via said through bores for interconnection within said junction box;

providing a downwardly opening chambered cover member which is sealingly cooperable with said base member to define a volume within which said interconnected electrical wires are contained; and employing said bosses and sockets to support said junction box.

26. The method of claim 25 further including the steps of providing strain relief means on said base member adjacent to each of said bore openings on said base member for securing said electrical wires thereto.

27. The method of claim 26 including the steps of configuring said strain relief means to include spaced apart paired stanchion portions adjacent each of said through bore openings, and an upright inclined arcuate wall portion connecting said spaced apart stanchion portions and defining a strain relief surface against which said electrical wires are secured.

28. The method of claim 27 further including the steps of employing said strain relief means to centralize or form into groups said electrical wires relative to said base member.

29. The method of claim 28 wherein said step of centralizing or grouping said electrical wires includes the steps of disposing each strain relief surface to be inclined along a radial line or parallel to or perpendicular to a length dimension of said base member of said junction box, and securing said electrical wires to said base member at said inclined surfaces to guide said wires to a central or grouped disposition relative to said base member.

30. The method of claim 26 including the step of arranging said bosses with said through bores, and said strain relief means to define plural real or virtual planes of symmetry for said junction box, so that said junction box has freedom of rotational positioning relative to external structure features.

* * * * *